(12) United States Patent
Asai

(10) Patent No.: US 10,174,720 B2
(45) Date of Patent: Jan. 8, 2019

(54) ENGINE

(71) Applicant: YANMAR CO., LTD., Osaka-shi, Osaka (JP)

(72) Inventor: Gou Asai, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 146 days.

(21) Appl. No.: 14/760,929

(22) PCT Filed: Jan. 14, 2014

(86) PCT No.: PCT/JP2014/050479
§ 371 (c)(1),
(2) Date: Jul. 14, 2015

(87) PCT Pub. No.: WO2014/112489
PCT Pub. Date: Jul. 24, 2014

(65) Prior Publication Data
US 2015/0369178 A1    Dec. 24, 2015

(30) Foreign Application Priority Data
Jan. 15, 2013  (JP) .................................. 2014-004699

(51) Int. Cl.
*F02M 26/19* (2016.01)
*F02M 26/34* (2016.01)
(Continued)

(52) U.S. Cl.
CPC ........... *F02M 25/0722* (2013.01); *F02B 1/12* (2013.01); *F02B 51/00* (2013.01);
(Continued)

(58) Field of Classification Search
CPC .... F02M 25/0722; F02M 26/34; F02M 26/36; F02M 35/108; F02M 26/05; F02M 26/28;
(Continued)

(56) References Cited

U.S. PATENT DOCUMENTS 7,201,156 B1 *  4/2007  Wait .......................... F01L 1/28
                                                       123/556
2004/0144337 A1    7/2004  Wakao et al.
(Continued)

FOREIGN PATENT DOCUMENTS

JP        H0988729 A     3/1997
JP       2004251273 A    9/2004
(Continued)

OTHER PUBLICATIONS

Extended Eurpoean Search Report corresponding to Application No. 14740928.8-1603/2947299, PCT/2014/050479; dated Sep. 22, 2016.
(Continued)

*Primary Examiner* — Syed O Hasan
(74) *Attorney, Agent, or Firm* — Norton Rose Fulbright US LLP

(57) ABSTRACT

Provided is an engine that suppresses the occurrence of knocking or an accidental fire, which makes it possible to perform the operations of premixed compression self-ignition. Regarding the present invention, an engine includes a reforming cylinder, which is a fuel reforming device, and the reforming cylinder is connected to an intake pipe and an EGR pipe via a supply pipe and connected to the intake pipe via an exhaust pipe, and a primary fuel injection device is provided that injects fuel to the mixture of intake air and exhaust gas supplied to the reforming cylinder through the supply pipe.

20 Claims, 6 Drawing Sheets

(51) Int. Cl.
*F02M 25/07* (2006.01)
*F02D 41/00* (2006.01)
*F02D 19/06* (2006.01)
*F02B 51/00* (2006.01)
*F02M 35/108* (2006.01)
*F02B 1/12* (2006.01)
*F02M 26/36* (2016.01)
*F02M 31/08* (2006.01)
*F02M 26/05* (2016.01)
*F02B 29/04* (2006.01)
*F02M 31/20* (2006.01)
*F02M 26/28* (2016.01)

(52) U.S. Cl.
CPC ..... *F02D 19/0671* (2013.01); *F02D 41/0025* (2013.01); *F02M 26/34* (2016.02); *F02M 26/36* (2016.02); *F02M 35/108* (2013.01); *F02B 29/0406* (2013.01); *F02M 26/05* (2016.02); *F02M 26/19* (2016.02); *F02M 26/28* (2016.02); *F02M 31/08* (2013.01); *F02M 31/20* (2013.01); *Y02T 10/36* (2013.01)

(58) Field of Classification Search
CPC ........ F02M 31/08; F02M 31/20; F02M 26/19; F02B 51/00; F02B 1/12; F02B 29/0406; F02D 19/0671; F02D 41/0025; Y02T 10/36

USPC .............. 123/305, 27 R, 62, 568.11, 568.12, 123/568.15, 573, 556
See application file for complete search history.

(56) References Cited

U.S. PATENT DOCUMENTS

| | | | |
|---|---|---|---|
| 2006/0112940 A1* | 6/2006 | Roberts, Jr. | F02D 25/00 123/568.11 |
| 2009/0101123 A1* | 4/2009 | Brogdon | B01F 3/02 123/568.15 |
| 2013/0061575 A1 | 3/2013 | Korenaga et al. | |

FOREIGN PATENT DOCUMENTS

| | | |
|---|---|---|
| JP | 2005105945 A | 4/2005 |
| JP | 2006037879 A | 2/2006 |
| JP | 2007278194 A | 10/2007 |
| WO | 2011145203 A1 | 11/2011 |

OTHER PUBLICATIONS

International Search Report corresponding to Application No. PCT/JP2014/050479; dated Apr. 22, 2014, with English translation.

* cited by examiner

ENGINE

This is the U.S. national stage of application No. PCT/JP2014/050479, filed on Jan. 14, 2014. Priority under 35 U.S.C. § 119(a) and 35 U.S.C. § 365(b) is claimed from Japanese Application No. 2013-004699, filed Jan. 15, 2013, the disclosure of which is also incorporated herein by reference.

TECHNICAL FIELD

The present invention relates to an engine and more particularly relates to a premixed compression ignition engine.

BACKGROUND ART

Conventionally, there have been known premixed compression ignition engines as engines that compress fuel under high pressure in a lean state and lead to self-ignition and combustion, thereby achieving the small amount of smoke and the small amount of NOx. The premixed compression ignition engine is configured to compress air-fuel mixture under high pressure in a combustion chamber and carry out self-ignition and combustion.

The premixed compression ignition engine is required to uniformly and leanly mix the fuel with intake air. Also, even when the fuel and the intake air are uniformly, leanly mixed, there is a high possibility that knocking or an accidental fire occurs due to change in terms of an elapsed time from the start time of start-up operation, engine load, an air-fuel ratio, and the like. Regarding the aforementioned premixed compression ignition engine, there has been known an engine in which exhaust gas (EGR gas) is mixed with the intake air at a predetermined timing based on the operational states of the engine, thereby suppressing the occurrence of the knocking or the accidental fire and appropriately controlling the state of combustion. For example, Patent Literature 1 discloses the above-mentioned engine.

However, in the premixed compression ignition engine disclosed in Patent Literature 1, the EGR gas mixed with the fuel substantially fluctuates in temperature thereof or constitution of components of the EGR gas, depending on the operational states of the engine. Accordingly, there is a disadvantage in that it is difficult to suppress the occurrence of the knocking or the accidental fire only based on the timing (quantity or density) of mixing the EGR gas.

CITATION LIST

Patent Literature

PTL 1: Japanese Unexamined Patent Application Publication No. 2005-105945

SUMMARY OF INVENTION

Technical Problem

The present invention has been achieved in view of the above-mentioned circumstances. It is an object of the present invention to provide an engine that can suppress the occurrence of knocking or an accidental fire and perform operations based on premixed compression self-ignition.

Solution to Problem

That is, in the present invention, regarding an engine configured to include a fuel reforming device, the fuel reforming device may be configured to be connected to an intake pipe and an EGR pipe via a supply pipe and configured to be connected to the intake pipe via an exhaust pipe, and a primary fuel injection device may be provided that injects fuel to a mixture of intake air and exhaust gas supplied to the fuel reforming device via the supply pipe.

Regarding the present invention, a reforming fuel intercooler configured to cool the mixture discharged from the fuel reforming device may be provided in the exhaust pipe.

Regarding the present invention, the fuel reforming device may be constituted with a reforming cylinder configured to adiabatically compress the mixture, to which the fuel is injected, by means of a reciprocating movement of a reforming piston, and the primary fuel injection device may be arranged in the reforming cylinder, and a control device configured to control in such a manner as to inject the fuel at a suction stroke or a first half of a compression stroke of the intake air may be further provided.

Regarding the present invention, the fuel reforming device may be constituted with a reforming cylinder configured to adiabatically compress the mixture, to which the fuel is injected, by means of a reciprocating movement of a reforming piston, and the primary fuel injection device may be arranged in the supply pipe, and a control device, when the mixture is supplied to the fuel reforming cylinder, configured to control in such a manner as to inject the fuel may be further provided.

Regarding the present invention, an auxiliary fuel injection device may be provided in an output cylinder of the engine, and the control device may be configured to control in such a manner as to inject the fuel at an adiabatic compression stroke or a first half of an expansion stroke of the output cylinder.

Advantageous Effects of Invention

As the effects of the present invention, the following advantageous effects are provided.

According to one aspect of the present invention, the fuel is reformed to the lower hydrocarbon fuel, in which the knocking is unlikely to occur, through the use of characteristics of the EGR gas, and the fuel is mixed with the intake air, so that the fuel and the intake air are uniformly and leanly mixed. Accordingly, the occurrence of the knocking or the accidental fire is suppressed, which makes it possible to perform the operations of the premixed compression self-ignition.

According to another aspect of the present invention, the additional amount of heat is eliminated from the reforming fuel. Accordingly, the occurrence of the knocking or the accidental fire is suppressed, which makes it possible to perform the operations of the premixed compression self-ignition.

According to another aspect of the present invention, the EGR gas and the fuel are uniformly mixed in a period from the injection of the fuel to the start of the adiabatic compression, thereby efficiently reforming the fuel. Accordingly, the occurrence of the knocking or the accidental fire is suppressed, which makes it possible to perform the operations of the premixed compression self-ignition.

According to another aspect of the present invention, when the ignitability in the output cylinder is in a low state, the ignition is assisted. Accordingly, the occurrence of the knocking or the accidental fire is suppressed, which makes it possible to perform the operations of the premixed compression self-ignition.

According to another aspect of the present invention, the EGR gas and the fuel are uniformly mixed until the adiabatic compression is started, thereby efficiently reforming the fuel. Accordingly, the occurrence of the knocking or the accidental fire is suppressed, which makes it possible to perform the operations of the premixed compression self-ignition.

DESCRIPTION OF EMBODIMENTS

Hereinafter, an engine 1 according to a first embodiment of the present invention will be described referring to FIGS. 1 and 2.

Figure 1:
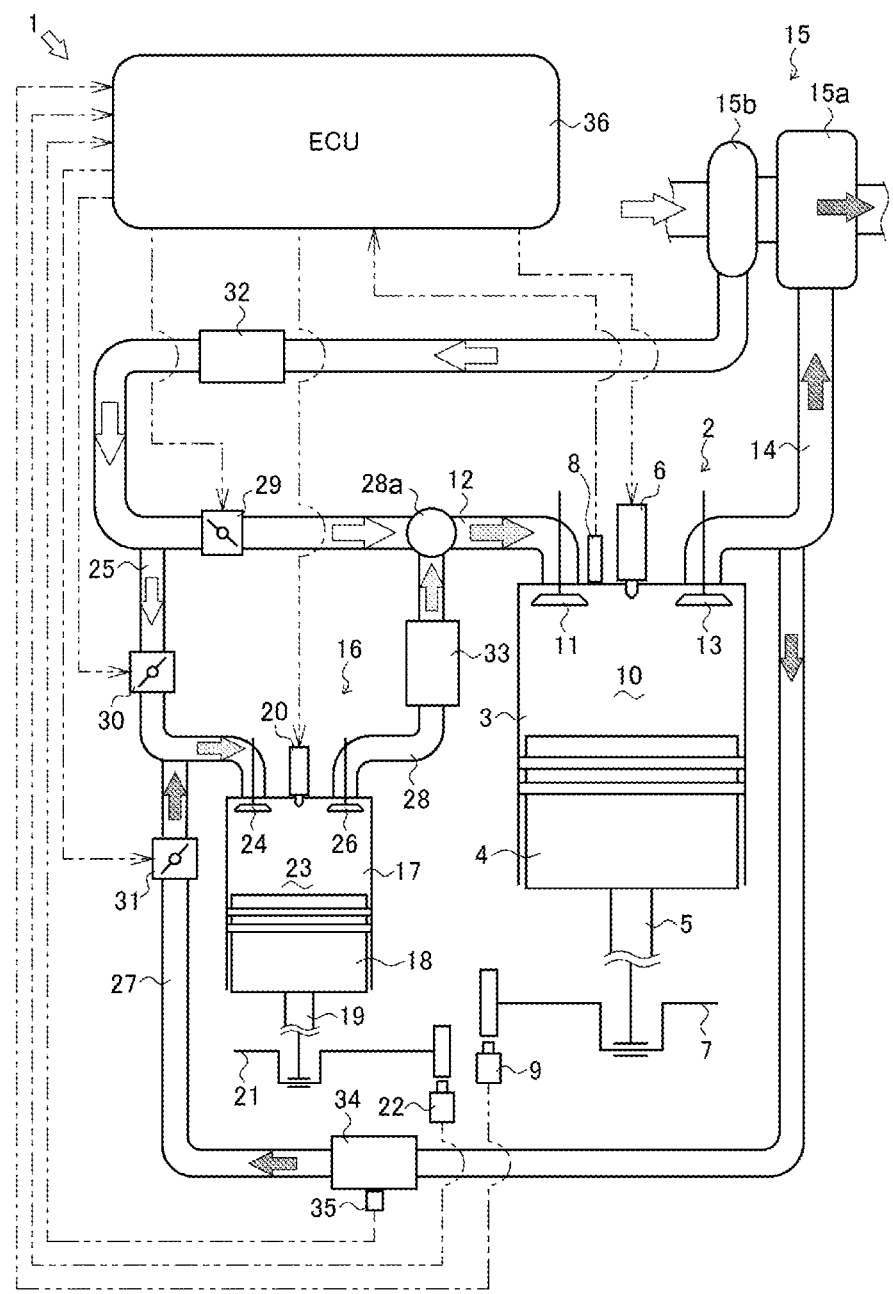
FIG. 1 is a schematic view illustrating the constitution of a first embodiment of an engine according to the present invention.
Figure 2:
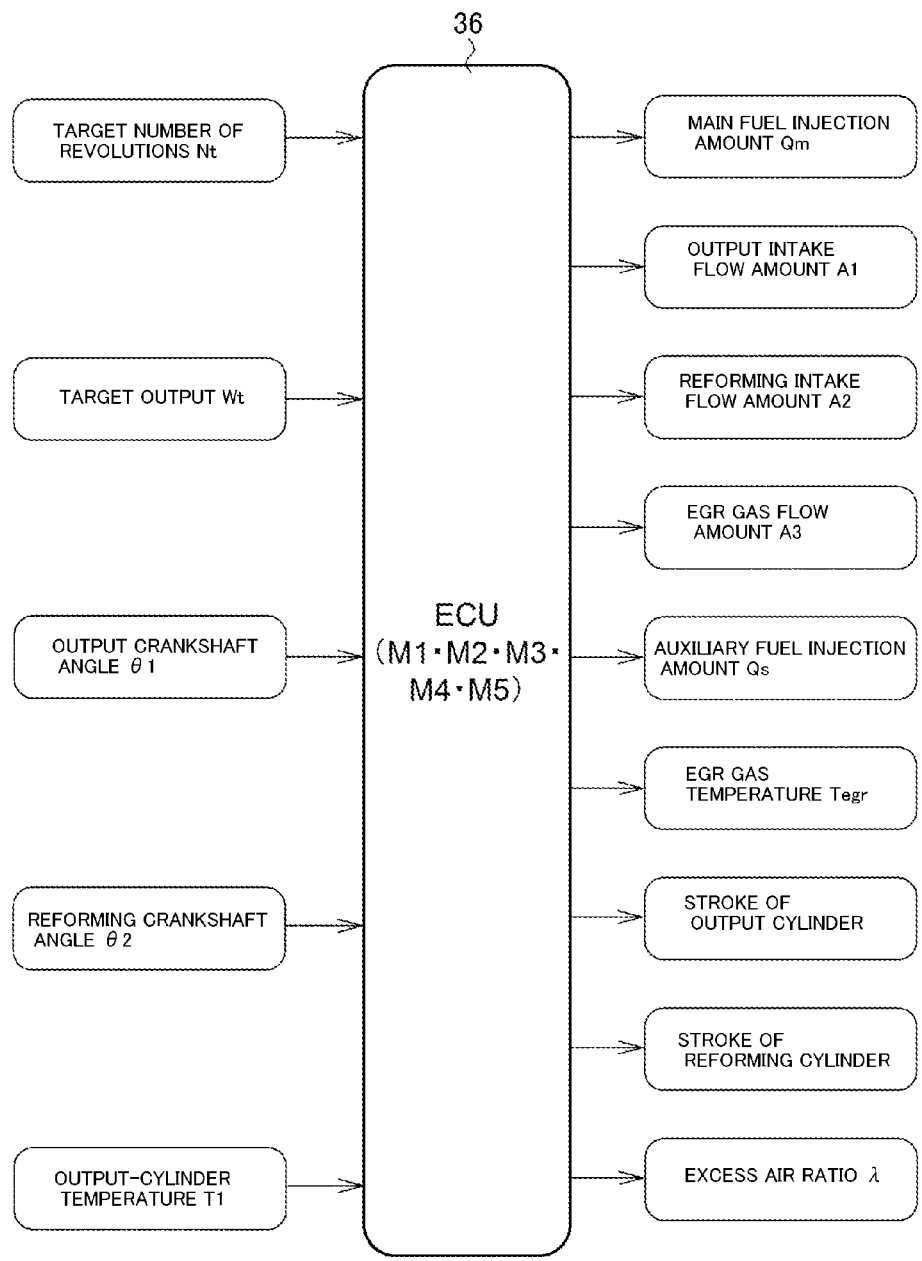
FIG. 2 is a schematic view illustrating the control constitution of the first embodiment and a second embodiment of the engine according to the present invention.

As illustrated in FIG. 1, the engine 1 is a diesel engine run on light oil or heavy oil as fuel. The engine 1 mainly includes an output cylinder 2, a supercharger 15, a reforming cylinder 16 that serves as a fuel reforming device, an intake intercooler 32, a reforming fuel intercooler 33, an EGR gas intercooler 34, and an ECU 36 as a control device.

The output cylinder 2 serves to generate power by the combustion of fuel and transmit the power to an output shaft. The output cylinder 2 includes an output cylinder 3, an output piston 4, an output connecting rod 5, and an auxiliary fuel injection device 6.

Regarding the output cylinder 2, the output piston 4 is slidably inserted into the interior of the output cylinder 3. The output cylinder 3 is configured such that one side thereof is blocked by a cylinder head not illustrated, and the other side thereof is opened. Regarding the output piston 4, the other side of the output cylinder 3 is connected to an output crankshaft 7, which is an output shaft, by means of the output connecting rod 5. The compressibility of the output cylinder 2 is set equal to or higher than 13 (e.g., approximately 13 to 18) in consideration of early ignition or the occurrence of the accidental fire.

An output-cylinder temperature detecting sensor 8 is provided for the output cylinder 3. An output-cylinder crank angle detecting sensor 9 is provided for the output crankshaft 7. A combustion chamber 10 made up of an inner wall of the output cylinder 3 and a lateral surface of the output piston 4 is constituted in the output cylinder 2. The auxiliary fuel injection device 6 that can inject fuel to the combustion chamber 10 is provided in the output cylinder 2. The auxiliary fuel injection device 6 is constituted by an injector that includes a hole-type nozzle. An intake pipe 12 is connected to the output cylinder 2 via an output intake valve 11, and an exhaust pipe 14 is connected to the output cylinder 2 via an output exhaust valve 13. It is noted that, in the present embodiment, the number of output cylinders 2 may be single or plural.

The supercharger 15 adiabatically compresses outside air and supplies the outside air to the combustion chamber 10 of the output cylinder 2. The supercharger 15 includes a turbine 15a and a compressor 15b. The turbine 15a is connected to the exhaust pipe 14 and configured such that the exhaust gas from the combustion chamber 10 can be supplied. The compressor 15b is connected to the intake pipe 12 and configured such that the outside air can be drawn in as the intake air and supplied to the combustion chamber 10. That is, the supercharger 15 is configured to convert the pressure of the exhaust gas into rotational power by means of the turbine 15a, transmit the rotational power to the compressor 15b, draw in the outside air by means of the compressor 15b, and adiabatically compress the outside air.

The fuel reforming device reforms fuel such as light oil to lower hydrocarbon fuel (e.g., methane) and suppresses pre-ignition. The fuel reforming device is constituted by the reforming cylinder 16. The reforming cylinder 16 reforms fuel by adiabatically compressing one wherein the mixture of the intake air and the exhaust gas (EGR gas) is injected by the fuel. The reforming cylinder 16 includes a reforming cylinder 17, a reforming piston 18, a reforming connecting rod 19, and a primary fuel injection device 20.

Regarding the reforming cylinder 16, the reforming piston 18 is slidably inserted into the interior of the reforming cylinder 17. The reforming cylinder 17 is configured such that one side thereof is blocked by the cylinder head not illustrated, and the other side thereof is opened. Regarding the reforming piston 18, one side of the reforming cylinder 17 is connected to a reforming crankshaft 21 by means of the reforming connecting rod 19. A reforming crank angle detecting sensor 22 is provided in the reforming crankshaft 21. A reforming chamber 23 made up of the inner wall of the reforming cylinder 17 and the lateral surface of the reforming piston 18 is constituted in the reforming cylinder 16. The primary fuel injection device 20 that can inject the fuel to the reforming chamber 23 is provided in the reforming cylinder 16. The primary fuel injection device 20 is constituted of nozzles such as a piston-type nozzle, a swirl injector, and an air assist injector.

Regarding the reforming cylinder 16, the reforming piston 18 is configured to be capable of reciprocating by the motive power from the reforming crankshaft 21 connected and interlocked with the output crankshaft 7. The compressibility of the reforming cylinder 16 is set equal to or higher than 15 (e.g., approximately 15 to 20) in consideration of heat loss. It is noted that, in the present embodiment, the reforming cylinder 16 is configured such that the motive power from the output crankshaft 7 is transmitted, but not limited to this. Also, the reforming cylinder 16 may be provided for each output cylinder 2, or one reforming cylinder 16 may be provided for a plurality of output cylinders 2. Also, it is possible to use the output cylinder 2 and the reforming cylinder 16 for the same purpose.

A supply pipe 25 is connected to the reforming cylinder 16 via a reforming intake valve 24, and an exhaust pipe 28 is connected to the reforming cylinder 16 via a reforming exhaust valve 26. The supply pipe 25 is connected to the intake pipe 12. That is, it is configured such that part of the intake air from the intake pipe 12 can be supplied to the supply pipe 25. Also, the supply pipe 25 is connected to the exhaust pipe 14 via an EGR pipe 27. That is, it is configured such that part of the exhaust gas from the combustion chamber 10 of the output cylinder 2 can be supplied to the supply pipe 25 as the EGR gas via the EGR pipe 27. Accordingly, it is configured such that the mixture of the intake air and the EGR gas can be supplied from the supply pipe 25 to the reforming chamber 23 of the reforming cylinder 16. The exhaust pipe 28 is connected to the intake pipe 12 on the downstream side with respect to the supply pipe 25 via a mixer 28a. Also, the reforming cylinder 16 is configured such that the lower hydrocarbon fuel (hereinafter, merely referred to as "reforming fuel"), in which the mixture is reformed, can be discharged from the reforming chamber 23 through the exhaust pipe 28 to the intake pipe 12.

A first intake adjusting valve 29 is provided in the intake pipe 12 on the downstream side with respect to the connecting position of the supply pipe 25 and on the upstream side with respect to the connecting position of the exhaust pipe 28. The first intake adjusting valve 29 is constituted by an electromagnetic flow control valve. The first intake adjusting valve 29 acquires a signal from the ECU 36, which is a control device described later, thereby changing the opening degree of the first intake adjusting valve 29. It is noted that, in the present embodiment, the first intake adjusting valve 29 is constituted with the electromagnetic flow control valve, but any valve that can change the flow amount of intake air may be applied.

A second intake adjusting valve 30 is provided in the supply pipe 25 on the upstream side with respect to the connecting position of the EGR pipe 27. The second intake adjusting valve 30 is constituted with the electromagnetic flow control valve. The second intake adjusting valve 30 acquires a signal from the ECU 36 described later, thereby changing the opening degree of the second intake adjusting valve 30. It is noted that, in the present embodiment, the second intake adjusting valve 30 is constituted with the electromagnetic flow control valve, but any valve that can change the flow amount of intake air may be applied.

An EGR gas adjusting valve 31 is provided in the EGR pipe 27. The EGR gas adjusting valve 31 is constituted with the electromagnetic flow control valve. The EGR gas adjusting valve 31 acquires a signal from the ECU 36 described later, thereby changing the opening degree of the EGR gas adjusting valve 31. It is noted that, in the present embodiment, the EGR gas adjusting valve 31 is constituted with the electromagnetic flow control valve, but any valve that can change the flow amount of intake air may be applied.

With the above-mentioned constitution, the engine 1 is configured to be capable of changing the mixture ratio of the intake air to the reforming fuel discharged from the reforming chamber 23 of the reforming cylinder 16 by means of the first intake adjusting valve 29. Also, the engine 1 is configured to be capable of changing the mixture ratio of the intake air to the EGR gas supplied to the reforming chamber 23 by means of the second intake adjusting valve 30 and the EGR gas adjusting valve 31.

The intake intercooler 32, the reforming fuel intercooler 33, and the EGR gas intercooler 34 serve to cool gas. The intake intercooler 32 is provided in the intake pipe 12. The intake intercooler 32 is configured to be capable of cooling the intake air adiabatically compressed by the compressor 15b. The reforming fuel intercooler 33 is provided in the exhaust pipe 28. The reforming fuel intercooler 33 is configured to be capable of cooling the reforming fuel discharged from the reforming chamber 23 of the reforming cylinder 16. The reforming fuel intercooler 33 is made up of a radiator or a heat exchanger in which air or water is provided as a cooling medium.

The EGR gas intercooler 34 is provided in the EGR pipe 27. The EGR gas intercooler 34 is configured to be capable of cooling the exhaust gas heated by the combustion of the fuel. Also, the EGR gas intercooler 34 includes a coolant flow adjusting valve not illustrated and an EGR gas temperature detecting sensor 35.

The ECU 36, which is a control device, serves to control the engine 1. Specifically, as illustrated in FIG. 2, the ECU 36 controls the auxiliary fuel injection device 6, the primary fuel injection device 20, the first intake adjusting valve 29, the second intake adjusting valve 30, the EGR gas adjusting valve 31, and the coolant flow adjusting valve of the EGR gas intercooler 34 and the like. Various programs and data for performing the control of the engine 1 are stored in the ECU 36. The ECU 36 may be configured such that a CPU, a ROM, a RAM, an HDD, and the like are connected via a bus, or configured to be made up of one-chip LSI and the like.

The ECU 36 stores various programs for performing the control of fuel injection, a main fuel injection amount map M1 for calculating a main fuel injection amount Qm based on the target number of revolutions Nt and the target output Wt of the engine 1, an intake flow amount map M2 for calculating an output intake flow amount A1 supplied to the combustion chamber 10 of the output cylinder 2 based on the target number of revolutions Nt and the main fuel injection amount Qm, a mixture flow amount map M3 for calculating a reforming intake flow amount A2 and an EGR gas flow amount A3 supplied to the reforming chamber 23 of the reforming cylinder 16 based on the target number of revolutions Nt and the main fuel injection amount Qm, an auxiliary fuel injection amount map M4 for calculating an auxiliary fuel injection amount Qs used for ignition and injected to the combustion chamber 10 based on the target number of revolutions Nt and the main fuel injection amount Qm, an EGR gas temperature map M5 for calculating an EGR gas temperature Tegr supplied to the reforming chamber 23 based on the target number of revolutions Nt and the main fuel injection amount Qm, and the like.

The ECU 36 is connected to the auxiliary fuel injection device 6 and can control the fuel injection of the auxiliary fuel injection device 6.

The ECU 36 is connected to the primary fuel injection device 20 and can control the fuel injection of the primary fuel injection device 20.

The ECU 36 is connected to the first intake adjusting valve 29 and can control the opening and closing of the first intake adjusting valve 29.

The ECU 36 is connected to the second intake adjusting valve 30 and can control the opening and closing of the second intake adjusting valve 30.

The ECU 36 is connected to the EGR gas adjusting valve 31 and can control the opening and closing of the EGR gas adjusting valve 31.

The ECU 36 is connected to the coolant flow adjusting valve, not illustrated, of the EGR gas intercooler 34 and can control the opening and closing of the coolant flow adjusting valve not illustrated.

The ECU 36 is connected to the output-cylinder temperature detecting sensor 8 and can acquire an output-cylinder temperature T1 detected by the output-cylinder temperature detecting sensor 8.

The ECU 36 is connected to the output-cylinder crank angle detecting sensor 9 and can acquire an output-cylinder crankshaft angle Al detected by the output-cylinder crank angle detecting sensor 9.

The ECU 36 is connected to the reforming crank angle detecting sensor 22 and can acquire a reforming crankshaft angle η2 detected by the reforming crank angle detecting sensor 22.

Hereinafter, the operational mode of each section of the engine 1 according to the first embodiment of the present invention will be described referring to FIGS. 1 to 5.

First, the paths of the intake air and the exhaust gas of the engine 1 will be described. As illustrated in FIG. 1, the outside air drawn in by the compressor 15b of the supercharger 15 is discharged to the intake pipe 12 in a state of being adiabatically compressed as the intake air. After being cooled by the intake intercooler 32, the intake air is supplied to the combustion chamber 10 of the output cylinder 2 via the intake pipe 12. Part of the intake air is supplied to the reforming chamber 23 of the reforming cylinder 16 via the supply pipe 25 connected to the intake pipe 12.

After the exhaust gas from the combustion chamber 10 of the output cylinder 2 rotates the turbine 15a of the supercharger 15 via the exhaust pipe 14, the exhaust gas is discharged to the outside. Part of the exhaust gas is supplied to the reforming chamber 23 of the reforming cylinder 16 as the EGR gas via the EGR pipe 27 and the supply pipe 25 connected to the EGR pipe 27. The reforming fuel discharged from the reforming chamber 23 recirculates in the intake pipe 12 via the exhaust pipe 28 and is supplied to the combustion chamber 10.

Next, the calculation of the various kinds of predetermined amounts in the ECU 36 will be described referring to FIG. 2. The ECU 36 calculates the main fuel injection amount Qm from the main fuel injection amount map M1 based on the target number of revolutions Nt and the target output Wt of the engine 1, which are determined by the operation amount of an operating tool not illustrated, and the like.

The ECU 36 calculates the output intake flow amount Al supplied to the combustion chamber 10 of the output cylinder 2 from the intake flow amount map M2 based on the target number of revolutions Nt and the main fuel injection amount Qm.

The ECU 36 calculates the reforming intake flow amount A2 and the EGR gas flow amount A3 supplied to the reforming chamber 23 of the reforming cylinder 16 from the mixture flow amount map M3 based on the target number of revolutions Nt and the main fuel injection amount Qm.

The ECU 36 calculates the auxiliary fuel injection amount Qs used for ignition and injected to the combustion chamber 10 of the output cylinder 2 from the auxiliary fuel injection amount map M4 for the ignition based on the target number of revolutions Nt and the main fuel injection amount Qm.

The ECU 36 calculates an EGR gas temperature Tegr supplied to the reforming chamber 23 of the reforming cylinder 16 from EGR gas temperature map M5 based on the target number of revolutions Nt and the main fuel injection amount Qm.

The ECU 36 acquires the output-cylinder crankshaft angle A1 detected by the output-cylinder crank angle detecting sensor 9 and the reforming crankshaft angle θ2 detected by the reforming crank angle detecting sensor 22 and calculates the strokes of the output cylinder 2 and the reforming cylinder 16.

Subsequently, the operational mode of the reforming cylinder 16 will be described. The ECU 36 controls the opening and closing of the second intake adjusting valve 30 in such a manner that the intake air is supplied only by the reforming intake flow amount A2 calculated, to the reforming chamber 23 of the reforming cylinder 16. Furthermore, the ECU 36 controls the opening and closing of the EGR gas adjusting valve 31 in such a manner that the EGR gas is supplied only by the EGR gas flow amount A3 calculated, to the reforming chamber 23. Accordingly, the mixture of the intake air and the EGR gas, which is supplied to the reforming chamber 23, is set to an oxygen concentration suitable for reforming the fuel.

Also, the ECU 36 controls the opening and closing of the coolant flow adjusting valve, not illustrated, of the EGR gas intercooler 34 in such a manner that the temperature of the EGR gas reaches the EGR gas temperature Tegr calculated. Accordingly, the mixture of the intake air and the EGR gas, which is supplied to the reforming chamber 23 of the reforming cylinder 16, is set to a temperature at which the fuel is appropriately reformed and a temperature at which the reforming cylinder 16 is not damaged by heat. Additionally, the heat efficiency of the engine 1 is improved by utilizing the heat of the EGR gas for the reforming of the fuel.

The ECU 36 controls the primary fuel injection device 20 in such a manner that the fuel is injected only by the main fuel injection amount Qm calculated, to the reforming chamber 23 of the reforming cylinder 16. In this manner, the fuel is injected to the reforming chamber 23 in such a manner as to obtain an equivalence ratio required to reform the fuel into the lower hydrocarbon fuel. Specifically, the ECU 36 controls the primary fuel injection device 20 in such a manner that the equivalence ratio of the main fuel injection amount Qm to the reforming intake flow amount A2 and the EGR gas flow amount A3 is equal to or higher than a predetermined value.

Figure 3:
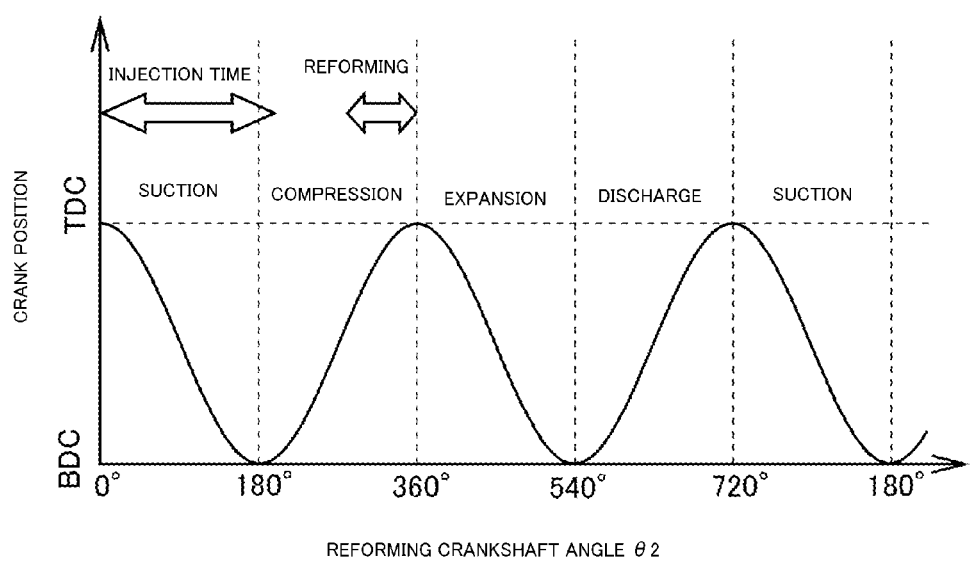
FIG. 3 is a view illustrating a graph that represents the relation of the crank position of a reforming cylinder and a fuel injection time in the first embodiment of the engine according to the present invention.

Also, as illustrated in FIG. 3, the ECU 36 controls in such a manner as to inject the fuel based on the reforming crankshaft angle θ2 acquired when the stroke of the reforming cylinder 16 is positioned at a suction stroke or the first half of a compression stroke of the intake air. Accordingly, the fuel injected to the reforming chamber 23 of the reforming cylinder 16 is uniformly dispersed into the mixture until the adiabatic compression is started by means of the reforming piston 18.

Figure 4:
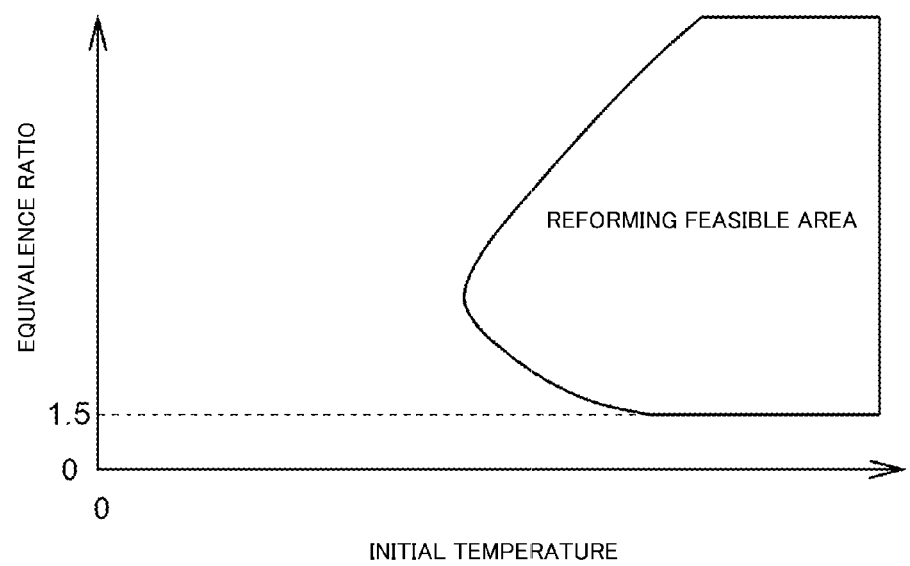
FIG. 4 is a view illustrating a graph that represents the reforming feasible area of fuel based on the initial temperature of the reforming cylinder and an equivalence ratio in the first embodiment and the second embodiment of the engine according to the present invention.

As described above, the fuel of a predetermined amount, which is uniformly dispersed into the mixture of a predetermined temperature and a predetermined oxygen concentration, is endothermically decomposed in the compression stroke of the reforming cylinder 16 and reformed to the gasified lower hydrocarbon fuel. The conditions under which the fuel can be reformed are defined by an equivalence ratio determined by the reforming intake flow amount A2, the EGR gas flow amount A3, and the main fuel injection amount Qm and an initial temperature determined by the reforming intake flow amount A2, the EGR gas flow amount A3, and the EGR gas temperature Tegr. That is, the reforming feasible area of the fuel, as illustrated in FIG. 4, is defined by the equivalence ratio and the initial temperature. Also, the composition of reforming fuel is also defined by the equivalence ratio and the initial temperature. In the present embodiment, the equivalence ratio of the fuel to the intake air is set equal to or higher than 1.5 (for example, approximately 1.5 to 10) in order to suppress the occurrence of carbon dioxide during the reforming.

The reforming fuel is supplied to the exhaust pipe 28 as a high-temperature fuel gas by means of the amount of residual heat that is not used for endothermic decomposition reaction during the reforming, out of the amount of heat of the intake air and the EGR gas. The high-temperature reforming fuel supplied to the exhaust pipe 28 is cooled by the reforming fuel intercooler 33 of the exhaust pipe 28. Accordingly, the early self-ignition in the output cylinder 2 is suppressed. The reforming fuel cooled by the reforming fuel intercooler 33 is supplied to the intake pipe 12 via the mixer 28*a*.

Figure 5:
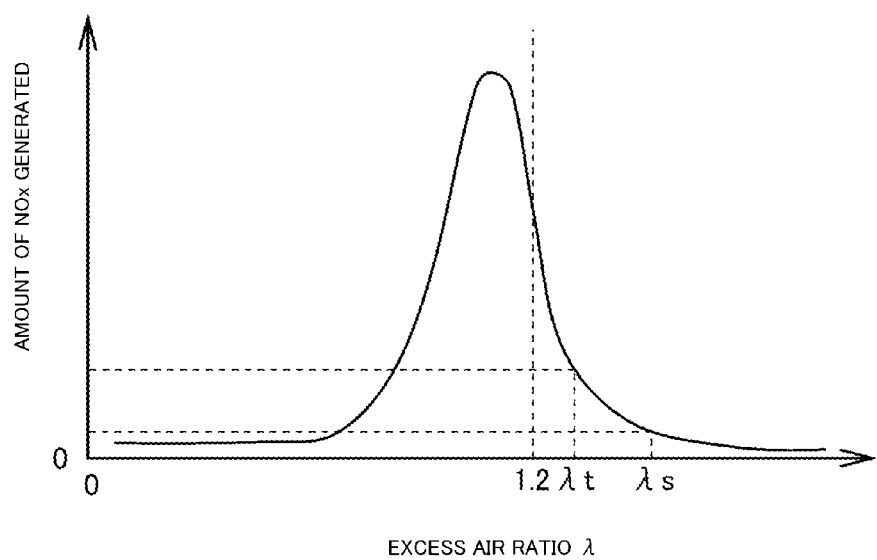
FIG. 5 is a view illustrating a graph that represents the relation of an excess air ratio of an output cylinder and the amount of NOx generated in the first embodiment and the second embodiment of the engine according to the present invention.

Next, the operational mode of the output cylinder 2 will be described. The ECU 36 controls the opening and closing of the first intake adjusting valve 29 in such a manner that the intake air is supplied only by the output intake flow amount A1 calculated, to the combustion chamber 10 of the output cylinder 2. That is, as illustrated in FIG. 5, the ECU 36 controls the opening and closing of the first intake adjusting valve 29 in such a manner that an excess air ratio λ calculated from the main fuel injection amount Qm and the opening degree of the first intake adjusting valve 29 with respect to the output cylinder 2 corresponds to a target value λt. Specifically, the ECU 36 controls the opening and closing of the first intake adjusting valve 29 such that the target value λt of the excess air ratio λ with respect to the output cylinder 2 is equal to or higher than 1.2. Accordingly, the output cylinder 2 is controlled in such a manner that the amount of NOx generated is suppressed.

When the output-cylinder temperature T1 acquired is equal to or less than a predetermined temperature, or when the excess air ratio λ of the output cylinder 2, which is calculated from the main fuel injection amount Qm and the opening degree of the first intake adjusting valve 29, is equal to or higher than an upper value λs, the ECU 36 injects the fuel of a predetermined amount to the combustion chamber 10 of the output cylinder 2 for the support of ignition. Accordingly, even in the condition under which the ignitability of the reforming fuel in the output cylinder 3 is low, and the premixed compression self-ignition is hardly performed at a desired timing, the ignition time can be arbitrarily controlled.

As described above, regarding the engine 1 according to the first embodiment of the present invention, the engine 1 that includes the reforming cylinder 16, which is a fuel reforming device, is represented such that the reforming cylinder 16 is connected to the intake pipe 12 and the EGR pipe 27 via the supply pipe 25 and connected to the intake pipe 12 via the exhaust pipe 28, and the primary fuel injection device 20 configured to inject the fuel to the mixture of the intake air and the exhaust gas supplied to the reforming chamber 23 of the reforming cylinder 16 via the supply pipe 25 is provided. With this constitution, the fuel is reformed to the lower hydrocarbon fuel, in which the knocking is unlikely to occur, through the use of characteristics of the EGR gas, and the fuel is mixed with the intake air, so that the fuel and the intake air are uniformly and leanly mixed. Accordingly, the occurrence of the knocking or the accidental fire is suppressed, which makes it possible to perform the operations of the premixed compression self-ignition.

Also, the reforming fuel intercooler 33 for cooling the mixture discharged from the reforming chamber 23 of the reforming cylinder 16 is provided in the exhaust pipe 28. With this constitution, the additional amount of heat is eliminated from the reforming fuel. Accordingly, the occurrence of the knocking or the accidental fire is suppressed, which makes it possible to perform the operations of the premixed compression self-ignition.

Also, the fuel reforming device is constituted with the reforming cylinder 16 that adiabatically compresses the mixture, to which the fuel is injected, by means of the reciprocating movement of the reforming piston 18, and the primary fuel injection device 20 is arranged in the interior of the reforming chamber 23 of the reforming cylinder 16, and the ECU 36, which is a control device, configured to control in such a manner as to inject the fuel at the suction stroke or the first half of the compression stroke of the intake air is further provided. With this constitution, the EGR gas and the fuel are uniformly mixed in a period from the injection of the fuel to the start of the adiabatic compression, thereby efficiently reforming the fuel. Accordingly, the occurrence of the knocking or the accidental fire is suppressed, which makes it possible to perform the operations of the premixed compression self-ignition.

Also, the auxiliary fuel injection device 6 is provided in the output cylinder 2 of the engine, and the ECU 36 controls in such a manner as to inject the fuel at the adiabatic compression stroke or the first half of the expansion stroke of the output cylinder 2. With this constitution, when the ignitability in the output cylinder 2 is in a low state, the ignition is assisted. Accordingly, the occurrence of the knocking or the accidental fire is suppressed, which makes it possible to perform the operations of the premixed compression self-ignition.

Figure 6:
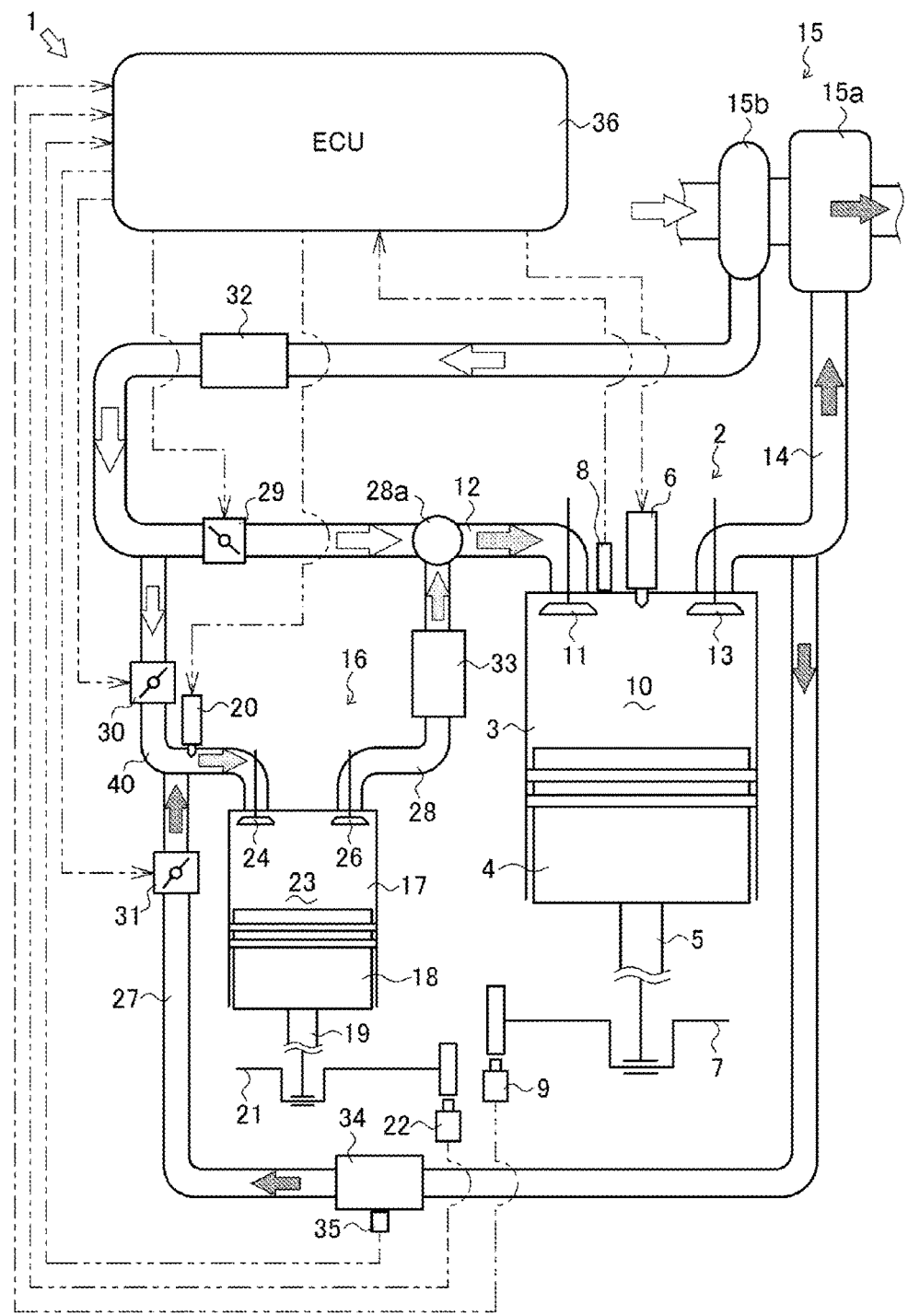
FIG. 6 is a schematic view illustrating the constitution of the second embodiment of the engine according to the present invention.

Next, the engine 1 of a second embodiment of the engine 1 according to the present invention will be described referring to FIG. 6. It is noted that, in the embodiment described below, regarding the same matters of the embodiments that have been already described, their specific descriptions are omitted, and the following description focuses on the different matters.

A supply pipe 40 is connected to the reforming cylinder 16 via the reforming intake valve 24, and an exhaust pipe 28 is connected to the reforming cylinder 16 via the reforming exhaust valve 26. The supply pipe 40 is connected to the intake pipe 12. Also, the supply pipe 40 is connected to the exhaust pipe 14 via the EGR pipe 27. That is, it is configured such that part of the exhaust gas from the combustion chamber 10 of the output cylinder 2 can be supplied to the supply pipe 40 as the EGR gas via the EGR pipe 27. Furthermore, the primary fuel injection device 20 that can inject the fuel is provided in the supply pipe 40. The exhaust pipe 14 is connected to the intake pipe 12 on the downstream side with respect to the supply pipe 40 via the mixer 28*a*. Accordingly, the fuel injected to the mixture of the intake air and the EGR gas in the supply pipe 40 is configured to be supplied to the reforming chamber 23 of the reforming cylinder 16. Also, the reforming cylinder 16 is configured such that the reforming fuel can be discharged from the reforming chamber 23 through the exhaust pipe 28 to the intake pipe 12.

Next, the operational mode of the reforming cylinder 16 will be described. The ECU 36 controls the primary fuel injection device 20 in such a manner that the fuel is injected only by the main fuel injection amount Qm calculated, to the supply pipe 40. In this manner, the fuel is injected to the supply pipe 40 in such a manner as to obtain an equivalence ratio required to reform the fuel in the reforming cylinder 16. Accordingly, the fuel injected to the supply pipe 40 is uniformly dispersed into the mixture until the fuel reaches the interior of the reforming chamber 23 of the reforming cylinder 16, and the adiabatic compression is started by means of the reforming piston 18.

As described above, regarding the engine 1 according to the second embodiment of the present invention, the fuel reforming device is constituted with the reforming cylinder 16 that adiabatically compresses the mixture, to which the fuel is injected, by means of the reciprocating movement of the reforming piston 18, and the primary fuel injection device 20 is arranged in the supply pipe 40, and the control device is further provided that, when the mixture is supplied to the reforming chamber 23 of the fuel reforming cylinder 16, controls in such a manner as to inject the fuel. With this constitution, the EGR gas and the fuel are uniformly mixed until the adiabatic compression is started, thereby efficiently reforming the fuel. Accordingly, the occurrence of the knocking or the accidental fire is suppressed, which makes it possible to perform the operations of the premixed compression self-ignition.

INDUSTRIAL APPLICABILITY

The present invention can be utilized for a premixed compression ignition engine.

REFERENCE SIGNS LIST

1 Engine
12 Intake pipe
16 Reforming cylinder
20 Primary fuel injection device
25 Supply pipe
26 EGR pipe

The invention claimed is:
1. An engine comprising:
a fuel reforming device constituted with a reforming cylinder, the fuel reforming device configured to connect to:
an intake pipe at a first location of the intake pipe via a supply pipe,
an EGR pipe via the supply pipe; and
the intake pipe at a second location of the intake pipe via an exhaust pipe coupled to an outlet of the reforming cylinder, the second location of the intake pipe positioned downstream of the first location of the intake pipe;
a primary fuel injection device configured to inject fuel to a mixture of intake air and exhaust gas supplied to the fuel reforming device via the supply pipe, the exhaust gas supplied to the fuel reforming device from an outlet of an output cylinder via the EGR pipe; and
a reforming fuel intercooler included in the exhaust pipe and connected to the intake pipe a via the exhaust pipe, the reforming fuel intercooler configured to receive reforming fuel from the reforming cylinder, cool the reforming fuel, and supply the cooled reforming fuel to the output cylinder via the intake pipe,
wherein the reforming cylinder is configured to adiabatically compress the mixture, to which the fuel is injected, by means of a reciprocating movement of a reforming piston, and reform the fuel to a lower hydrocarbon fuel by the reforming cylinder; and
wherein the primary fuel injection device is arranged in the reforming cylinder and is configured to control injection of the fuel at a suction stroke or a first half of a compression stroke of the intake air.
2. The engine according to claim 1, further comprising:
an auxiliary fuel injection device provided in the output cylinder,
the auxiliary fuel injection device configured to control injection of the fuel at an adiabatic compression stroke or a first half of an expansion stroke of the output cylinder.
3. The engine according to claim 1, further comprising:
a supercharger coupled to the intake pipe and to an exhaust pipe of the output cylinder.
4. The engine according to claim 3, wherein the supercharger comprises:
a compressor comprising an outlet coupled to the intake pipe; and
a turbine comprising an inlet coupled to the exhaust pipe and configured to receive at least a portion of the exhaust gas that is output by the output cylinder.
5. The engine according to claim 1, wherein an output crank shaft corresponding to the output cylinder is independent of the reforming cylinder.
6. The engine according to claim 1, further comprising:
a mixer positioned at the second location and comprising an outlet coupled to an inlet of the output cylinder, the mixer configured to receive the cooled reforming fuel.
7. The engine according to claim 1, wherein the reforming cylinder is in fluid communication with a single output cylinder, the single output cylinder comprises the output cylinder.
8. The engine according to claim 1, wherein the reforming cylinder is in fluid communication with multiple output cylinders, the multiple output cylinders comprise the output cylinder.
9. An engine comprising:
a fuel reforming device constituted with a reforming cylinder, the fuel reforming device configured to connect to:
an intake pipe at a first location of the intake pipe via a supply pipe;
an EGR pipe via the supply pipe; and
the intake pipe at a second location of the intake pipe via an exhaust pipe coupled to an outlet of the reforming cylinder, the second location of the intake pipe positioned downstream of the first location of the intake pipe;
a primary fuel injection device configured to inject fuel to a mixture of intake air and exhaust gas supplied to the fuel reforming device via the supply pipe, the exhaust gas supplied to the fuel reforming device from an outlet of an output cylinder via the EGR pipe; and
a reforming fuel intercooler included in the exhaust pipe and connected to the intake pipe via the exhaust pipe, the reforming fuel intercooler configured to receive reforming fuel from the reforming cylinder, cool the reforming fuel, and supply the cooled reforming fuel to the output cylinder via the intake pipe,
wherein the reforming cylinder is configured to adiabatically compress the mixture, to which the fuel is injected, by means of a reciprocating movement of a reforming piston, and reform the fuel to a lower hydrocarbon fuel by the reforming cylinder; and
wherein the primary fuel injection device is arranged in the supply pipe and is configured to control injection of the fuel when the mixture is supplied to the reforming cylinder.
10. The engine according to claim 9, further comprising:
an auxiliary fuel injection device provided in the output cylinder,
the auxiliary fuel injection device configured to control injection of the fuel at an adiabatic compression stroke or a first half of an expansion stroke of the output cylinder.
11. The engine according to claim 9, further comprising:
a supercharger coupled to the intake pipe and to an exhaust pipe of the output cylinder.

12. The engine according to claim 11, wherein the supercharger comprises:
a compressor comprising an outlet coupled to the intake pipe; and
a turbine comprising an inlet coupled to the exhaust pipe and configured to receive at least a portion of the exhaust gas that is output by the output cylinder.

13. The engine according to claim 9, wherein an output crank shaft corresponding to the output cylinder is independent of the reforming cylinder.

14. The engine according to claim 9, further comprising:
a mixer positioned at the second location and comprising an outlet coupled to an inlet of the output cylinder, the mixer configured to receive the cooled reforming fuel.

15. The engine according to claim 9, wherein the reforming cylinder is in fluid communication with a single output cylinder, the single output cylinder comprises the output cylinder.

16. The engine according to claim 9, wherein the reforming cylinder is in fluid communication with multiple output cylinders, the multiple output cylinders comprise the output cylinder.

17. An engine comprising:
a fuel reforming device configured to connect to:
an intake pipe at a first location of the intake pipe via a supply line;
an EGR pipe via the supply pipe; and
the intake pipe at a second location of the intake pipe via an exhaust pipe, the second location of the intake pipe positioned downstream of the first location of the intake pipe;
a primary fuel injection device configured to inject fuel to a mixture of intake air and exhaust gas supplied to the fuel reforming device via the supply pipe, the exhaust gas supplied to the fuel reforming device from an outlet of an output cylinder via the EGR pipe, wherein the fuel reforming device configured to reform the fuel to a lower hydrocarbon fuel;
a reforming fuel intercooler included in the exhaust pipe and connected to the intake pipe a via the exhaust pipe, the reforming fuel intercooler configured to receive reforming fuel from the fuel reforming device, cool the reforming fuel, and supply the cooled reforming fuel to the output cylinder via the intake pipe; and
the output cylinder including an auxiliary fuel injection device configured to control injection of the fuel at an adiabatic compression stroke or a first half of an expansion stroke of the output cylinder.

18. The engine according to claim 17, further comprising:
a supercharger coupled to the intake pipe and to an exhaust pipe of the output cylinder, the supercharger comprising:
a compressor comprising an outlet coupled to the intake pipe; and
a turbine comprising an inlet coupled to the exhaust pipe and configured to receive at least a portion of the exhaust gas that is output by the output cylinder.

19. The engine according to claim 17, wherein the fuel reforming device is in fluid communication with a single output cylinder, the single output cylinder comprises the output cylinder.

20. The engine according to claim 17, wherein the fuel reforming device is in fluid communication with multiple output cylinders, the multiple output cylinders comprise the output cylinder.

* * * * *